Sept. 16, 1969     S. M. MOBERG     3,467,427
ALL-PLASTIC SEAL
Filed March 29, 1968
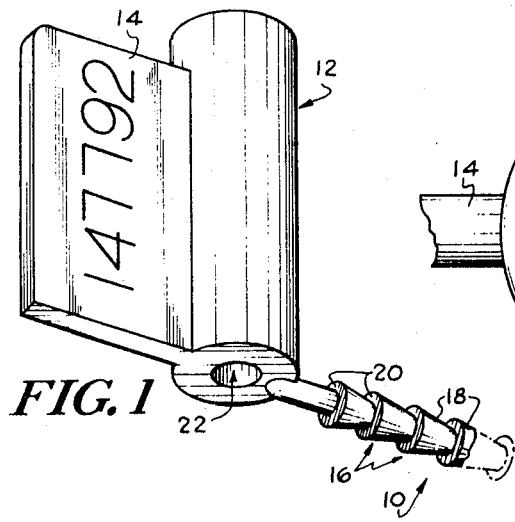
FIG. 1
FIG. 2
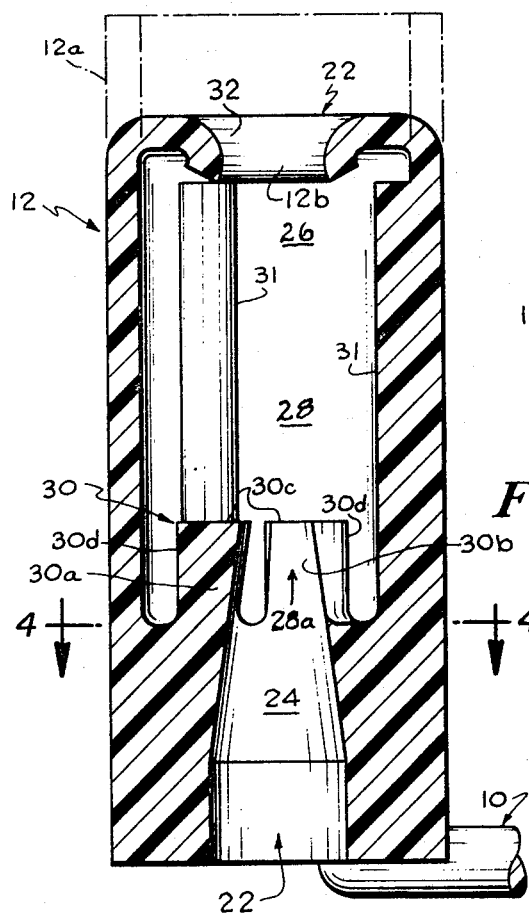
FIG. 3
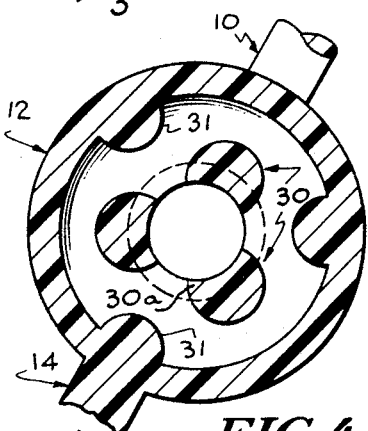
FIG. 4
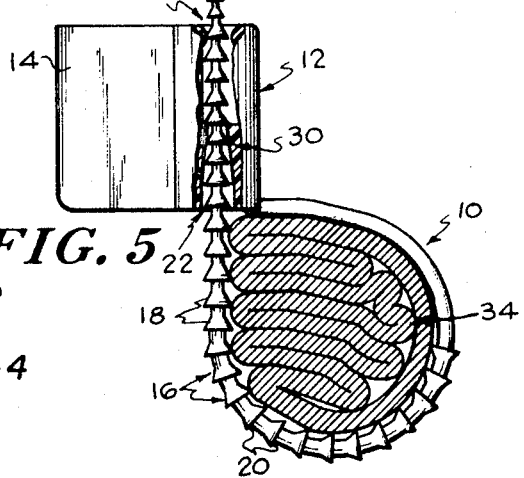
FIG. 5
INVENTOR:
SIGURD M. MOBERG
BY Robert T. Henderson
ATTORNEY United States Patent Office 3,467,427
Patented Sept. 16, 1969

3,467,427
ALL-PLASTIC SEAL
Sigurd M. Moberg, East Orange, N.J., assignor to E. J. Brooks Company, Newark, N.J., a corporation of New Jersey
Filed Mar. 29, 1968, Ser. No. 717,154
Int. Cl. B65d 55/06, 33/34, 27/30
U.S. Cl. 292—322                              8 Claims

ABSTRACT OF THE DISCLOSURE

A seal formed entirely of moldable, resilient plastic material includes a circular group of similar, resilient, fingers entirely enclosed within a cylindrical housing, and having extremities thicker than their roots which latter are integral with the housing near one end thereof. The fingers extend within the housing and toward the latter's other end and have inner surfaces defining a generally conical, expansible passage tapering toward the housing's other end; and said extremities are arranged to lockably engage any one of a plurality of annular ridges formed along a substantial part of the length of a shackle.

Background of the invention

All-plastic seals have hitherto been developed having a group of fingers, at one end of a looped shackle, adapted to receive and hold therein an enlarged other end of the shackle against any movement thereof which could reduce the size of the shackle's loop. Thus, said earlier seal could only be applied loosely to an object. Moreover, the fingers have been exposed, thereby permitting tampering with the seal.

Objects of this invention

The principal objects are to prevent such tampering and to provide an economically moldable, all-plastic seal which, without the use of any separate tool, may be tightened upon an object to be sealed such as, for example, a neck of a bag. These objects are accomplished according to this invention by provision of a seal substantially as set forth in the foregoing abstract and as hereinafter detailed.

The drawing

In the drawing:

FIG. 1 is a perspective view of a preferred form of seal according to this invention, as immediately prior to a last step in the manufacture thereof. Although the seal may be made in various sizes, this figure shows the seal approximately three times the actual size of one form of practical, usable seal.

FIG. 2 is a considerably enlarged, end elevational view of the unfinished seal of FIG. 1, as viewed from the top of that figure.

FIG. 3 is a similarly enlarged, central, longitudinal sectional view of the housing of said seal and parts therein, substantially on the line 3—3 of FIG. 2; said housing being shown in full lines as after completion of said last step, and one end portion of the housing being shown in broken lines as before performance of said last step.

FIG. 4 is a cross-sectional view of said housing and parts therein, substantially at the line 4—4 of FIG. 3.

FIG. 5 is a reduced view of said seal shown, for illustrative purposes, as closed upon a bag neck; the seal's housing being partly broken away to show the relation of parts in the housing.

Description of the illustrated seal

The seal is molded, in one piece, of suitable plastic material such as, for example, polyethylene, which is relatively rigid in thick sections and flexible in thin sections. The plastic material selected should have such hardness and flexibility characteristics as would enable the molded seal to function as hereinafter described.

The seal comprises two essential principal parts, a flexible shackle 10 and a shackle capturing housing 12 to which one end of the shackle is integrally connected. Optionally, but with some advantage, an integral ear 14 extends radially from one side of the housing, preferably the side opposite to the shackle. This ear may carry a number, in a security system in which the seal is to be used; and the ear also facilitates handling of the seal in applying it to and/or removing it from a bag or other sealed object.

The shackle 10 is thin enough to give it substantial flexibility, and is formed with a series of annular ridges 16 thereon, each of which, preferably, has a wedging surface 18 facing toward the free end of the shackle, and a locking surface 20 facing away from said free end. A very satisfactory form of annular ridge is illustrated as being frustoconical with a flat base or surface 20 of the cone facing away from the shackle's free end.

The housing 12 is substantially hollow, having a central longitudinal passage 22 extending completely therethrough. A shackle-entrance end portion 24 of this passage is preferably formed to taper toward the other, or shackle-exit end portion 26 of said passage. The passage 22 has a central portion 28, communicatively extending between the end portions 24 and 26, this central portion being considerably enlarged radially to accommodate therewithin plural, similar, resilient, locking fingers 30 with sufficient free space around the latter to enable them to expand and contract as hereinafter explained. The housing 12 is preferably reinforced, internally, by inner longitudinal ribs 31.

The fingers 30 appear in the drawing as in their relaxed, i.e. contracted, condition. They are shown as three in number, equi-distantly spaced in a circle with their roots 30a integral with coaxial portions of the housing 12. The illustrated fingers 30 extend toward the shackle-exit end of the housing. They are almost circular in cross-section, their circularity being interrupted by a portion 28a of the passage 22 which extends within the plural fingers. The passage portion 28a is defined by inner surfaces 30b of the fingers which surfaces taper toward free ends 30c of said fingers. This taper, together with the condition that outer surfaces 30d are cylindrical rather than tapered, enhances the flexibility of the finger roots 30a by reducing the thickness of said roots and enhances the rigidity and strength of the finger ends 30c and their capability of performing a locking function with reference to the shackle 10.

The shackle-exit end of the housing 12 is initially molded in cylindrical form as shown in broken lines at 12a (FIG. 3) in a main molding step or steps in which other parts of the seal are formed. Then, after the manufacture of the seal has otherwise been completed, the portion 12a is annularly curled in, as at solid lines 12b, at a suitable temperature and under suitable pressure, and by the use of a suitable curling die. This provides a shackle-exit opening 32 which is amply large to accommodate the shackle therein but small enough to prevent excessive lateral movement of the shackle at that end of the housing.

Manner of using the seal

The seal, as supplied by the manufacturer, has its shackle 10 connected at its one end to the exterior of the housing 12, but otherwise, the shackle is free.

The seal may be used upon hasps of boxes, meters, etc., or to fasten tags to some article from which the tag, at least for a time, should not be removed. In such uses, the shackle is passed through some passage, hole or loop on such a box, meter or other article, and then locked as hereinafter described.

The seal's use is illustrated in FIG. 5 as on a neck 34 of a bag which may contain money or something else which is to be safeguarded. The shackle 10 is passed around the bag neck 34, whereafter the shackle's free end is pushed into and through the passage 22 as illustrated in FIG. 5. During this pushing, successive ridges 16 repeatedly wedge the fingers 30 apart. The user may grasp the free end of the shackle, then protruding from the shackle-exit end of the housing 12, and pull the shackle sufficiently to tighten it about the bag neck. This pulling and tightening is greatly facilitated by the ridges 16 on said protruding end of the shackle as said ridges afford a firm hand grip upon the shackle.

Alternatively, the shackle may first be introduced into the housing 12 to initially form a loop in the shackle, whereafter the loop may be passed over and onto the bag neck and then tightened upon the latter. If the seal is merely to be attached loosely to some article to be safeguarded, the shackle need be pushed into the passage 22 only to the extent that some one of the ridges 16 is locked within the fingers 30.

Pushing and/or pulling of the shackle 10 upwardly (as viewed in FIG. 3) through the passage 22 requires very little force because of the mild taper of passage portion 28a and also because the roots 30a of the fingers 30 are relatively thin, thereby enabling the fingers to flex quite freely about said roots in response to the wedging action of the ridges 16. In the presence of a downward pull, however, a ridge 16 engages the acute-angular, inner edges of the free ends 30c of the fingers 30 and, thereby positively locks the shackle against being withdrawn downwardly from the housing 12.

If the ridges 16 are shaped as disclosed herein, the ridge's wedging surfaces 18 supplement the taper of the inner faces of the fingers 30 to enable the shackle to be pushed upwardly in the housing 12 very easily, while the flat locking surfaces 20 impose only an axially directed force upon said fingers and avoid spreading the latter apart.

As the free ends of the fingers 30 are thicker than their roots 30a, said free ends are of ample strength to avoid breakage or collapse in the presence of any effort to pull the shackle from the housing.

The seal may easily be removed from a sealed article by cutting or forcibly breaking the shackle 30. Of course, an interloper would avoid doing this as he, ordinarily, would not have a similar seal to replace one removed by him.

It will be understood that the disclosed concepts may be embodied in seals somewhat different in detail from the seal disclosed herein without departing from this invention.

I claim:
1. A seal constituted entirely of moldable, plastic material which is resilient in relatively thin sections and relatively rigid in thicker sections, said seal comprising a cylindrical housing, an elongate shackle, integral with said housing and formed with a plurality of spaced, annular ridges therealong, a circular group of similar, resilient fingers within said housing, each of said fingers having a root portion which is integral with said housing toward a shackle-entrance end thereof and extending freely within said housing toward a shackle-exit end thereof, said group of fingers having inner surfaces defining a generally conical, expansible, shackle-receptive passage portion tapering toward said shackle-exit end, and said fingers and ridges being so shaped relatively to each other as to permit projection of said shackle into said housing at said shackle-entrance end thereof and movement therein forwardly toward said shackle-exit end thereof but to prevent reverse movement of the shackle within the housing.

2. A seal according to claim 1, said root portions of the fingers being of such thinness as to enable the fingers to flex angularly about said root portions.

3. A seal according to claim 1, said root portions of the fingers being of such thinness as to enable the fingers to flex angularly about said root portions, and said fingers having free end portions of substantially greater thickness and rigidity than said root portions.

4. A seal according to claim 3, said free end portions having end surfaces coincident with a plane extending transversely of said housing and substantially perpendicular to the latter's axis.

5. A seal according to claim 1, said housing having a main, shackle receptive passage, inclusive of said expansible passage portion, extending centrally and longitudinally of said housing and opening at opposite ends of the latter; and said main passage having a relatively wide-mouthed, tapered portion at its shackle-entrance end; the taper of the latter portion being continuous relatively to the taper of said expansible passage portion.

6. A seal according to claim 5, said main passage being defined, at its shackle-exit end, by a curled-in, annular lip, limiting the diameter of said main passage at its latter end, to limit lateral movement of a shackle within said main passage.

7. A seal according to claim 1, said ridges having annular wedging surfaces facing toward the free end of the shackle, and substantially flat, annular locking surfaces facing toward the opposite end of the shackle.

8. A seal according to claim 4, said ridges having annular wedging surfaces facing toward the free end of the shackle, and substantially flat, annular locking surfaces facing toward the opposite end of the shackle; said locking surfaces coacting with said end surfaces of the fingers to oppose withdrawal of the shackle from within the housing.

References Cited

UNITED STATES PATENTS

| | | | |
|---|---|---|---|
| 3,086,265 | 4/1963 | Orenick | 24—30.5 |
| 3,118,200 | 1/1964 | Bell | 24—16 |
| 3,265,426 | 8/1966 | Brooks | 292—307 |
| 3,290,080 | 12/1966 | Dawson | 292—322 |
| 3,402,435 | 9/1968 | Merser | 24—16 |

MARVIN A. CHAMPION, Primary Examiner

EDWARD J. McCARTHY, Assistant Examiner

U.S. Cl. X.R.

24—16, 30.5